US007123352B2

(12) United States Patent
Han et al.

(10) Patent No.: US 7,123,352 B2
(45) Date of Patent: *Oct. 17, 2006

(54) APPARATUS AND METHOD FOR MONITORING OPTICAL SIGNAL

(75) Inventors: Ki Ho Han, Busan (KR); Wangjoo Lee, Daejeon (KR); Je Soo Ko, Daejeon (KR)

(73) Assignee: Electronics and Telecommunications Research Institute, (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/938,078

(22) Filed: Sep. 10, 2004

(65) Prior Publication Data

US 2005/0094130 A1   May 5, 2005

(30) Foreign Application Priority Data

Oct. 29, 2003   (KR) .................. 10-2003-0075799

(51) Int. Cl.
*G01N 21/00* (2006.01)
(52) U.S. Cl. ..................................... 356/73.1
(58) Field of Classification Search ............... None
See application file for complete search history.

(56) References Cited

U.S. PATENT DOCUMENTS

| | | | | |
|---|---|---|---|---|
| 5,930,414 A | * | 7/1999 | Fishman et al. .......... | 385/11 |
| 6,023,360 A | * | 2/2000 | Morioka et al. .......... | 398/1 |
| 6,130,766 A | * | 10/2000 | Cao ......................... | 398/147 |
| 6,433,864 B1 | * | 8/2002 | Chung et al. ............ | 356/73.1 |
| 6,678,431 B1 | * | 1/2004 | Han et al. ................ | 385/11 |

FOREIGN PATENT DOCUMENTS

| | | |
|---|---|---|
| KR | 2001-0112511 | 12/2001 |
| KR | 2002-0022163 | 3/2002 |

OTHER PUBLICATIONS

"A High Performance Optical Spectrum Monitor with High-Speed Measuring Time for WDM Optical Networks", K. Otsuka, et al., Sep. 1997, Conf. Publication No. 448, IEE 1997, pp. 147-150.
"Optical performance monitor built into EDFA repeaters for WDM networks", K. Asahi, et al, OFC '98 Technical Digest, 2 pages.
"OSNR Monitoring Technique Using Polarization-Nulling Method", J. Lee, et al., IEEE Photonics Technology Letters, vol. 13, No. 1, Jan. 2001, pp. 88-90.

* cited by examiner

*Primary Examiner*—Tu T. Nguyen
(74) *Attorney, Agent, or Firm*—Blakely Sokoloff Taylor & Zafman (57) ABSTRACT

An apparatus and method for monitoring an optical signal are provided. In the apparatus, a polarization adjusting unit converts the state of polarization of an optical signal. A polarization beam splitter splits the optical signal into a first polarization component and a second polarization component perpendicular to each other. An optical intensity measuring unit measures the optical intensity of the first polarization component. A feedback control unit controls the polarization adjusting unit so that the first and second polarization components are aligned to the two axes of the polarization beam splitter. A scrambler scrambles the optical signal input to the transmission optical fiber. According to the apparatus and method, optical signal-to-noise ratio (OSNR) can be measured accurately.

12 Claims, 6 Drawing Sheets

FIG. 2

PSP: PRINCIPAL STATES OF POLARIZATION
PBS: POLARIZATION BEAM SPLITTER

APPARATUS AND METHOD FOR MONITORING OPTICAL SIGNAL

This application claims priority from Korean Patent Application No. 2003-75799, filed on Oct. 29, 2003, the contents of which are incorporated herein by reference in their entirety.

BACKGROUND OF THE INVENTION

1. Field of the Invention

The present invention relates to an apparatus and method for monitoring an optical signal in a wavelength division multiplexing (WDM) optical transmission system, and more particularly, to an apparatus and method for accurately monitoring an optical signal in an optical transmission system irrespective of polarization mode dispersion (PMD).

2. Description of the Related Art

In a WDM optical transmission system, various optical amplifiers compensate an optical signal for losses occurring in transmission sections and at the same time amplified spontaneous emission (ASE) noise generating in the amplifiers affects the optical signal. The ASE noise lowers the optical signal-to-noise ratio (OSNR) and therefore degrades the performance of the system. Accordingly, in order to monitor and evaluate the performance of the WDM optical transmission system, the measurement of the OSNR is needed.

In a dynamically reconfigurable WDM optical transmission system, in which a plurality of wavelength channels are multiplexed and transmitted, the OSNR may differ in each channel, since optical signals transmitted from different nodes travel along different routes and pass through different numbers of amplifiers. Thus, ASE noise levels may differ in respective channels and therefore per-channel OSNR monitoring is necessary for accurate evaluation of the performance of each optical channel in WDM system.

Among the prior art to measure an OSNR, there is a technology disclosed in an article by K, Otsuka, et al, "A high-performance optical spectrum monitor with high-speed measuring time for WDM optical networks" in academic publication '97 European Conference on Optical Communication'. This article uses a diffraction grating and an array of optical detectors to split each wavelength spatially and measure optical power, and by doing so, measures an OSNR. The drawback of this technology is that if power of an optical signal in each signal is assumed to be constant, then even when the ASE noise levels in respective channels in dynamically reconfigurable WDM networks are different, an identical OSNR value is measured in each channel. In addition, the technology is sensitive to optical spatial alignment.

Another prior art technology to measure an OSNR is one disclosed in an article by K. Asahi, et al, "Optical performance monitor built into EDFA repeaters for WDM networks", announced in '98 Optical Fiber Conference'. This technology uses an acoustic optical variable filter to scan respective wavelengths and measure optical signal power and ASE power, and by doing so, calculates the OSNR. However, this technology has a drawback that it cannot accurately measure OSNRs different in each channel.

Another prior art technology to measure an OSNR is one disclosed in U.S. Pat. No. 6,433,864 "Apparatus for monitoring optical signal-to-noise ratio of optical signals in WDM optical transmission system" filed by Y. C. Chung, et al. This technology suggests a method calculating an OSNR from beat noise detected by using electric filters and the power of an optical signal measured from a demultiplexed optical signal. This method enables to measure OSNRs different in respective channels but may cause an error due to the effect of undesired signal that may be generated at a predetermined frequency where beat noise is measured. In addition, the effect of polarization mode dispersion (PMD) may cause an error.

Another prior technology is one disclosed in an article, "OSNR monitoring technique using polarization-nulling method", by J. H. Lee, et al., in academic publication, IEEE Photonics Technology Letters, vol. 13, 2001. This method uses a quarter wave plate and a linear polarizer to adjust polarization of an optical signal and calculates an OSNR from the output power measured when the polarizer and the signal polarization are horizontal, and the output power measured when they are vertical, that is, a signal polarization disappeared. However, when PMD exists in transmission optical fiber, an optical signal has two orthogonal polarization components delayed in time from each other, that is, two principal states of polarization. Accordingly, even though a signal polarization is adjusted, the signal polarization is not nullified by the polarizer. Therefore, this technology has a drawback that as PMD increases, an error in a measured OSNR value increases.

SUMMARY OF THE INVENTION

The present invention provides an apparatus and method by which an optical signal-to-noise ratio (OSNR) in each channel can be accurately monitored in a dynamically reconfigurable wavelength division multiplexing (WDM) optical transmission system where ASE noise level varies with respect to channels and there is an effect of polarization mode dispersion (PMD).

According to an aspect of the present invention, there is provided an apparatus for monitoring an optical signal comprising: a polarization adjusting unit which converts the state of polarization of an optical signal received through transmission optical fiber; a polarization beam splitter which splits the optical signal output from the polarization adjusting unit into a first polarization component and a second polarization component perpendicular to each other; an optical intensity measuring unit which measures the optical intensity of the first polarization component; a feedback control unit which by using the electric spectrum of the second polarization component, controls the polarization adjusting unit so that the first and second polarization components are aligned to the two axes of the polarization beam splitter; and a scrambler which if the first and second polarization components are aligned to the two axes of the polarization beam splitter by the feedback control unit, scrambles the optical signal input to the transmission optical fiber.

According to another aspect of the present invention, there is provided a method for monitoring an optical signal comprising: converting the state of polarization of an optical signal received through transmission optical fiber; splitting the optical signal, in which the polarization component is converted, into a first polarization component and a second polarization component perpendicular to each other; measuring the optical intensity of the first polarization component; by using the electric spectrum of the second polarization component, feedback controlling so that the first and second polarization components are aligned to predetermined two axes; and if the first and second polarization components are aligned to the two axes by the feedback controlling, scrambling the optical signal input to the transmission optical fiber.

By doing so, in a dynamically reconfigurable WDM optical transmission system where ASE noise level varies with respect to channels and there is an effect of PMD, an OSNR for each channel can be accurately measured.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
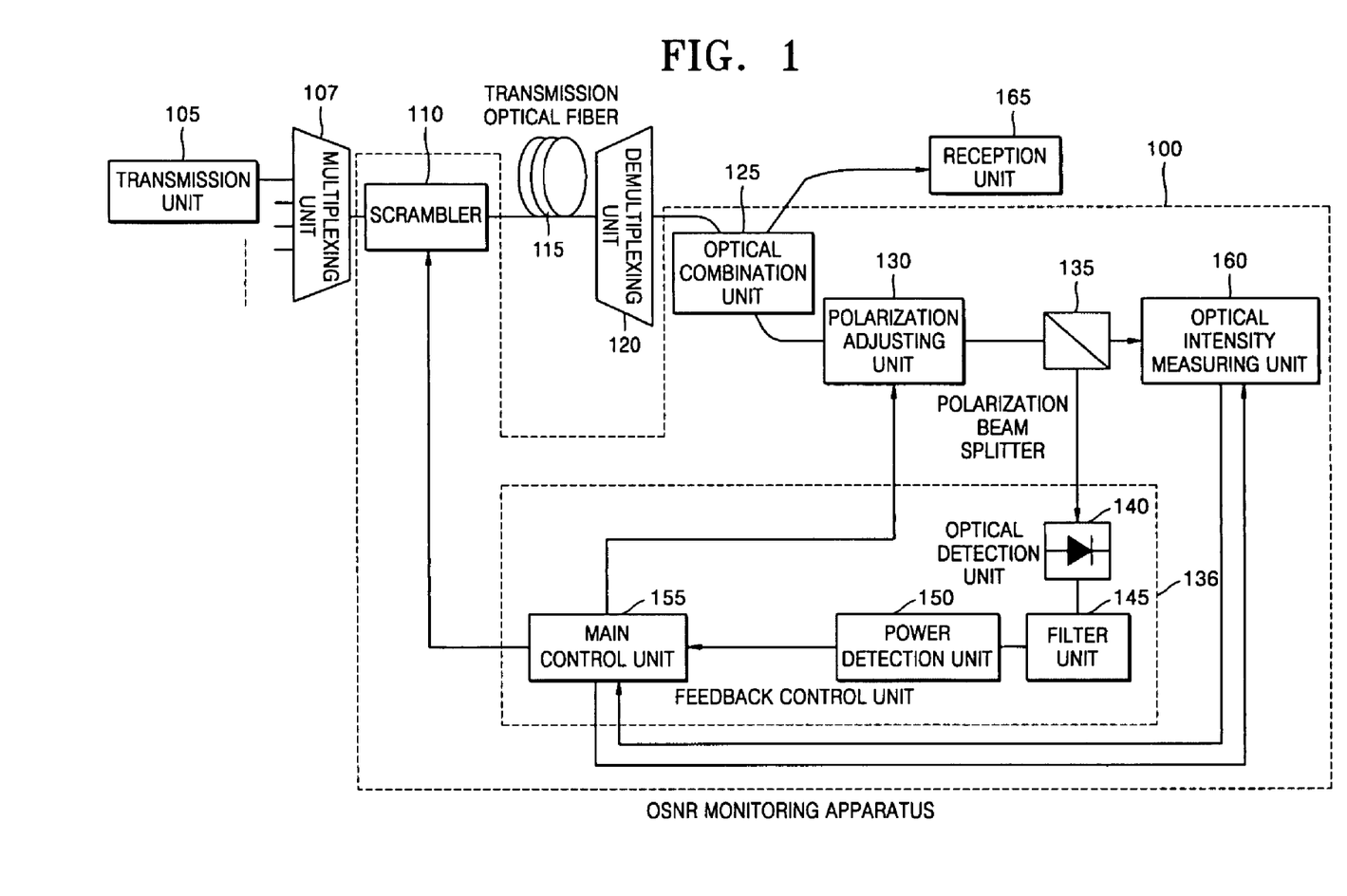
FIG. 1 is a diagram of the structure of an apparatus for monitoring an optical signal according to the present invention.

Referring to FIG. 1, an apparatus for monitoring an optical signal according to the present invention comprises a scrambler 110, an optical combination unit 125, a polarization adjusting unit 130, a polarization beam splitter 135, a feedback control unit 136, and an optical intensity measuring unit 160. The feedback control unit 136 comprises an optical detection unit 140, a filter unit 145, a power detection unit 150 and a main control unit 155. The OSNR monitoring apparatus according to the present invention is connected to a WDM optical transmission system comprising a transmission unit 105, a multiplexing unit 107, transmission optical fiber 115, a demultiplexing unit 120, and a reception unit 165, and monitors an OSNR.

The transmission unit 105 comprises a plurality of transmission units and each transmission unit 105 outputs an optical signal of a variety of channels. The multiplexing unit 107 multiplexes multi-channel optical signals output from the transmission unit 105 and inputs to the transmission optical fiber 115. The multiplexed optical signal experiences a time delay difference between two polarization components perpendicular to each other, that is, two principal states of polarization (PSP), due to polarization mode dispersion (PMD) existing in the transmission optical fiber 115.

The demultiplexing unit 120 demultiplexes the optical signal which experienced a time delay difference, and splits into respective channels. The optical combination unit 125 branches the optical signal split by channels, by sending part of the signal to the reception unit 165 and the remaining part to the OSNR monitoring apparatus 100 according to the present invention.

The polarization adjusting unit 130 converts the state of polarization of the optical signal received through the transmission optical fiber 115.

The polarization beam splitter 135 splits the optical signal output from the polarization adjusting unit 130 into a first polarization component and a second polarization component, which are perpendicular to each other, through a feedback process. The polarization beam splitter 135 aligns the first and second polarization components in parallel to the two axes of the polarization beam splitter 135. As a result, the polarization beam splitter 135 splits the optical signal into respective PSP components.

The feedback control unit 136 uses the electric spectrum of the second polarization component to control the polarization adjusting unit 130 so that the first and second polarization components of the optical signal are aligned to the two axes of the polarization beam splitter 135. The polarization adjusting unit 130 converts the polarization state of the optical signal according to the control signal of the feedback control unit 136.

The feedback control unit 136 comprises the optical detection unit 140, the filter unit 145, the power detection unit 150, and the main control unit 155. The optical detection unit 140 converts the second polarization component output from the polarization beam splitter 135 into an electrical signal.

The filter unit 145 passes only part of the electrical signal converted by the optical detection unit 140, the part in a predetermined frequency band. When the data format is 10 Gb/s NRZ, the filter unit generally filters the electrical signal band centering at 10 GHz frequency. The filter unit 145 uses a band pass filter (BPF) to pass a predetermined frequency band part of a signal.

The power detection unit 150 detects the size of the power of the signal filtered by the filter unit 145. The detected power value is input to the main control unit 155. The main control unit 155 stores a previously measured power value and compares the currently measured power value with the previously measured power value. The main control unit 155 controls the polarization adjusting unit 130 so that the currently measured power value is less than the previously measured power value.

If the feedback process by the feedback control unit 136 is repeated, the power value converges on a minimum value as a result. Then, the two PSP components are aligned in parallel to the two axes of the polarization beam splitter 135, separated to each other and output through the two output paths of the polarization beam splitter 135.

The main control unit, once the PSP components are aligned to the two axes of the polarization beam splitter 135, outputs an operation start signal to the scrambler 110.

If the operation start signal from the main control unit 155 is received, the scrambler 110 scrambles the optical signal input to the transmission optical fiber 115. That is, the scrambler 110 changes the optical intensity ratio between the two PSP components such that the power of one PSP component output from one axis of the polarization beam splitter 135 has a maximum value and a minimum value alternately.

The optical intensity measuring unit 160 measures the maximum value and minimum value of the optical signal that change cyclically by the operation of the scrambler 110. By using the maximum value and the minimum value of the optical signal measured by the optical intensity measuring unit 160, the main control unit 155 calculates and outputs the OSNR.

The principle of splitting two PSP components and the method for calculating the OSNR will now be explained in detail referring to equations.

In the transmission optical fiber 155, there are fast axis and slow axis, that is, two PSPs perpendicular to each other. These two PSPs will be denoted by PSP+ and PSP−, respectively. It is assumed that light from the monochrome light source is incident to the transmission optical fiber 115 through an external modulator. The incident light experiences a time delay difference of differential group delay (DGD) $\tau_f$ between the two PSP components, travels through the transmission optical fiber 115 and the demultiplexing unit 120, and then through the polarization adjusting unit 130 and the polarization beam splitter 135, and input to the optical detection unit 140. The power spectrum photoelectric-converted by the optical detection unit 140 is expressed as the following equation 1:

$$S(\omega) = \alpha_0^2 I_0^2 \{(a^4+b^4+2a^2b^2\cos\omega\tau_f)|F(\omega)|^2 + 4a^2b^2|H(\omega)|^2$$
$$-4ab\cos\omega_0\tau_f \cdot Re[(a^2\exp(i\omega\tau_f)+b^2)F(\omega)H^*(\omega)]\} \quad (1)$$

Here, $F(\omega)$ and $H(\omega)$ denotes Fourier transforms of $\cos^2(\Delta\Phi(t)/2)$ and $\cos(\Delta\Phi(t+\tau)/2)\cos(\Delta\Phi(t)/2)$, and $a=\cos\theta_0\cos\theta$ and $b=\sin\theta_0\sin\theta$, respectively. $\Delta\Phi(t)(=\pi[1-f(t)](f(t): \text{data}(0 \text{ or } 1))$ denotes the phase difference between two waveguides of the external modulator, $\omega_0$ denotes the frequency of signal light, $\alpha_0$ denotes the loss of the entire optical link including the optical combination unit 125, $\theta_0$ denotes the angle between the polarization of the optical fiber input light and the fast axis (PSP+), $\theta$ denotes the angle between the PSP+ component of optical signal input to the polarization beam splitter 135 and a polarization axis (x-axis) of the polarization beam splitter 135. $I_0$ denotes the intensity of the transmission end light source, and is $\omega=2\pi f$.

Figure 2:
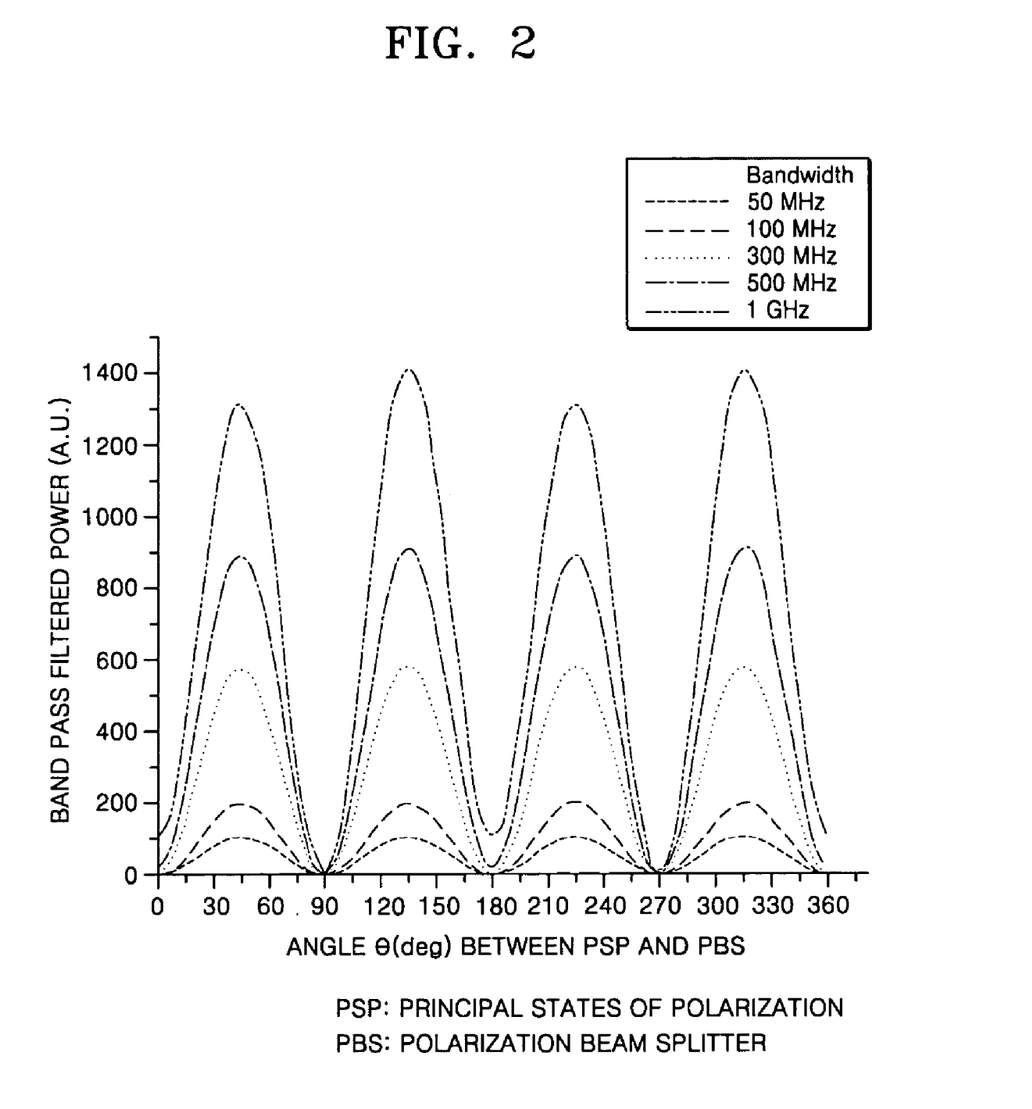
FIG. 2 is a graph showing simulation of changes in power with respect to angles between principal states of polarization (PSP) and a polarization beam splitter (PBS)

FIG. 2 is a graph showing simulation of changes in power with respect to angles between PSPs and the polarization beam splitter 135. When it is assumed that data square pulse stream $f(t)$ of an arbitrary 10 Gb/s NRZ optical signal is 01011100101100 in a time domain of $-7T \leq t \leq 7T$ (T: bit period), FIG. 2 shows a graph of changes of power that is 10 GHz band passed, with respect to the angle between the PSPs and the axis of the polarization beam splitter 135, obtained by simulation by changing filter widths. Here, $\theta_0=\pi/6$ and $\tau_f=30$ ps.

Generally, the envelope of $F(\omega)$ for the square pulse signal of pseudo random bit sequence (PRBS) NRZ data with a bit period of T, has a sinc function and has value 0 at frequency $f=n/T(n=1, 2, 3, \ldots)$. At this time, it is shown in FIG. 2 that $S(\omega)$ converges on a minimum value at $\theta=n\pi/2$ ($n=0, 1, 2, \ldots$).

When the power value converges, that is, $\theta$ is any one of $\theta=n\pi/2$ ($n=0, 1, 2, \ldots$), the two PSP components are aligned in parallel with the two perpendicular axes of the polarization beam splitter 135 and separated from each other. For convergence of the power value, the feedback control unit compares the currently measured value and the previously measured value of $S(\omega)$ and provides a feedback voltage to the polarization adjusting unit 130 so that the currently measured value is always less than the previously measured value.

If this feedback process is repeated, the power value converges on $\theta=n\pi/2$ ($n=0, 1, 2, \ldots$), and accordingly, the two PSP components separated by the polarization beam splitter 135 proceed along different paths.

As shown in FIG. 2, this convergence is performed identically for changes of the band pass filter of the filter unit 145. The graph of FIG. 2 shows that when the filter width is big, the power values at $\theta=n\pi/2$ ($n=0, 2, 4, \ldots$), and at $\theta=n\pi/2$ ($n=1, 3, 5, \ldots$) converge on different minimum values. This is because of the optical intensity difference between the two PSPs and finite filter bandwidth.

When data type is RZ and the pulse width ratio to bit time is 0.5, a monitoring frequency enabling to track PSP is $f=2n/T$ ($n=0, 1, 2, \ldots$). As this PSP tracking method operates real time, even in the presence of temporally varying PMD, two PSP components are always separated and the separation is maintained.

If the two PSP components are separated to the two axes of the polarization beam splitter 135 and output, the main control unit 155 sends a command to the scrambler 110 located at the transmission part, asking it to scramble the optical fiber input polarization. The scrambler 110 changes the relative optical intensity ratio of the two PSP components such that the power of one PSP component output from one axis of the polarization beam splitter 135 is repeated between a maximum value and a minimum value. At this time the maximum value and the minimum values are expressed as the following equation 2:

$$P_{\max} = P_s + \frac{P_{ASE}}{2} \quad \text{(maximum value)} \quad (2)$$

$$P_{\min} = \frac{P_{ASE}}{2} \quad \text{(minimum value)}$$

Here, $P_S$ and $P_{ASE}$ denote the power of the optical signal and the power of ASE noise, respectively. From this, OSNR is obtained as the following equation 3:

$$OSNR = \frac{P_S B_0}{P_{ASE} B_r} = \frac{(P_{\max} - P_{\min})B_0}{2 P_{\min} B_r} \quad (3)$$

Here, $B_0$ denotes the bandwidth of the optical filter and $B_r$ denotes a predetermined resolution bandwidth.

Figure 3:
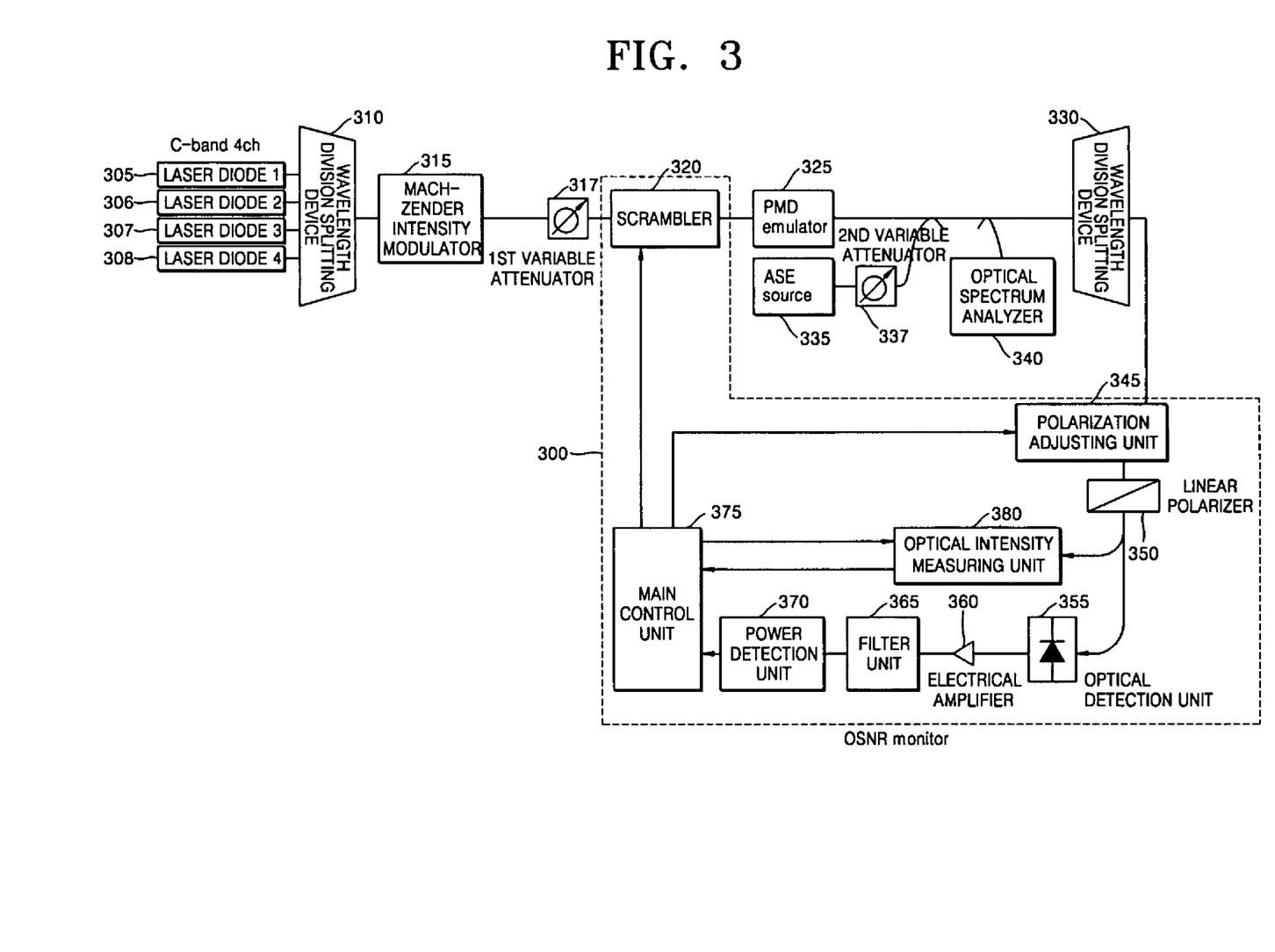
FIG. 3 is a diagram of the structure of an experiment apparatus to experiment an apparatus for monitoring an optical signal according to the present invention.

FIG. 3 is a diagram of the structure of an experiment apparatus to prove experimentally the structure and principle of an apparatus for monitoring an optical signal according to the present invention.

Referring to FIG. 3, the experiment apparatus comprises laser diodes 305 through 308, an arrayed waveguide grating (AWG) 310, a Mach-Zehnder intensity modulator 315, a first variable attenuator 317, a PMD emulator 325, an ASE source 335, a second variable attenuator 337, an optical spectrum analyzer 340, and an OSNR monitoring apparatus 300.

The wavelength of the light sources output from the four laser diodes 305 through 308 is between 1553.4 nm and 1555.7 nm, and the wavelength interval of the light sources output from respective laser diodes is 0.8 nm. The AWG 310 multiplexes or demultiplexes 4 channel optical signals output from the four laser diodes 305 through 308 and for this, has a 0.8 nm channel interval and a 0.41 nm pass band.

The Mach-Zehnder intensity modulator 315 driven by a pulse pattern generator generates a 10 Gb/s PRBS NRZ signal having a $(2^{31}-1)$ pattern length. The first variable attenuator 317 disposed after the external Mach-Zehnder modulator 315, which is an external converter, adjusts the intensity of signal light.

The PMD emulator 325 emulates the PMD occurring in the transmission optical link. The operation principle of the PMD emulator 325 is that two polarizations separated from the polarization beam splitter and perpendicular to each other are temporally delayed and again combined in the polarization beam splitter.

The ASE source 335 generates ASE noise. The ASE source 335 uses two optical amplifiers formed with two gain blocks to generate ASE noise. The second variable attenuator 337 disposed after the ASE source 335 changes the ASE noise level to adjust the OSNR. The optical spectrum analyzer 340 is disposed after the PMD emulator 325 and the ASE source 335 to measure the optical spectrum of an optical signal. Based on the measured optical spectrum, the performance of the OSNR monitoring apparatus is evaluated. The analysis of the OSNR performance will be explained in detail referring to FIG. 4.

The OSNR monitoring apparatus 300 comprises a polarization adjusting unit 345, a linear polarizer 350, an optical intensity measuring unit 380, an optical detection unit 355, an electrical amplifier 360, a filter unit 365, a power detection unit 370, a main control unit 375, and a scrambler 320. The polarization adjusting unit 345, the optical intensity measuring unit 380, the optical detection unit 355, the filter unit 365, the power detection unit 370, the main control unit 375, and the scrambler 320 are the same as in the structure of the OSNR monitoring apparatus 100 according to the present invention described above referring to FIG. 1 and detailed explanation will be omitted.

The linear polarizer 350 is used instead of the polarization beam splitter 135 of the OSNR monitoring apparatus shown in FIG. 1. The linear polarizer 350 outputs an optical signal as a linear polarization, showing a higher polarization extinction ratio than that of the polarization beam splitter 135.

The path for the output light of the linear polarizer 350 is divided into two paths by an optical coupler (not shown) with a coupling ratio of 1:1. The optical signal proceeding along one of the two paths travels along the optical detection unit 355, the electrical amplifier 360, the filter unit 365, and the power detection unit 370 sequentially and arrives at the main control unit 375. The electrical amplifier 360 amplifies an electric signal photoelectric-converted by the optical detection unit 355.

The main control unit sends a feedback control signal to the polarization adjusting unit 345. The polarization adjusting unit 345 converts the polarization of the optical signal according to the feedback control signal such that only one of the two PSP components passes through the linear polarizer 350.

If only one PSP component passes through the linear polarizer 350, the main control unit sends an operation start command to the scrambler 320, and commands the optical intensity measuring unit 380 to measure the maximum value and minimum value of the optical power. Then, by using the maximum value and minimum value measured by the optical intensity measuring unit 380, the main control unit 375 calculates the OSNR.

Figure 4:
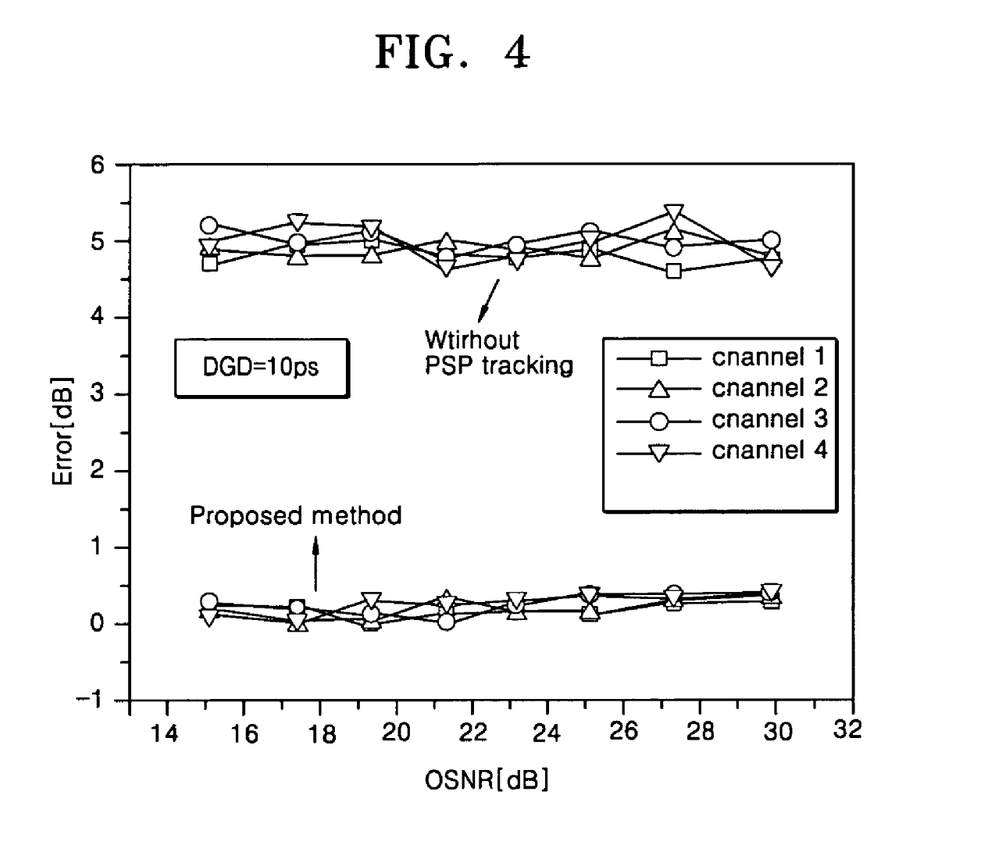
FIG. 4 is a graph comparing OSNR measurement error values of the prior art with those according to the present invention.

FIG. 4 is a graph comparing OSNR measurement error values of the prior art with those according to the present invention by using the experiment apparatus of FIG. 3.

Referring to FIG. 4, when DGD is given as 10 ps by the PMD emulator, the graph shows a comparison between the OSNR measurement error value by the present invention with a characteristic of splitting PSPs and the OSNR measurement error value measured from the output value of a linear polarizer by simply adjusting a polarization adjusting unit without a PSP splitting process.

The error values FIG. 4 show the OSNR measurement value difference and the measurement value difference by the optical spectrum analyzer 340 according to the two methods, when the intensity of input signal light input to the linear polarizer 350 for all channel is fixed at −10 dBm and the OSNR is changed by adjusting the ASE noise amount.

As shown in FIG. 4, when the DGD is 10 ps, the error values measured by using only the polarization adjusting unit 345 and the linear polarizer 350 are about 4.5~5.5 dB for all channels, while when the present invention tracking and splitting PSPs was used, the error values for all channel are less than about 0.4 dB.

Figure 5:
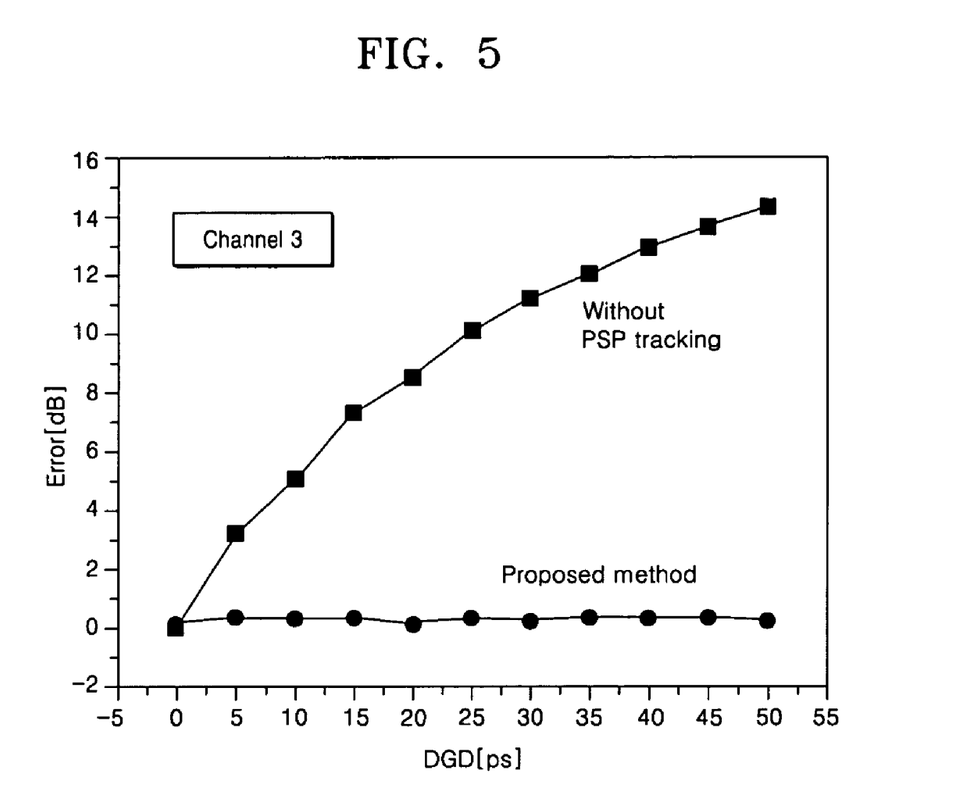
FIG. 5 is a graph comparing OSNR measurement error values of the prior art with those according to the present invention with respect to differential group delay (DGD)

FIG. 5 is a graph comparing OSNR measurement error values of the prior art with those according to the present invention with respect to the DGD.

More specifically, when the OSNR was fixed to about 25 dB for channel 3 with a wavelength of 1554.9 nm, the changes in the OSNR measurement error values with respect to the DGD increase were measured without splitting PSPs and with splitting PSPs according to the present invention. FIG. 5 shows the comparison of the results.

As shown in FIG. 5, when the optical signal monitoring apparatus according to the present invention was used, the OSNR measurement error was maintained as a constant value always within about 0.4 dB despite the DGD increase, while in the experiment without splitting PSPs, the measurement error increased with respect to the DGD increase. In addition, the increase curve with respect to the DGD of FIG. 5 showed a tendency of saturation for large DGD values.

Figure 6:
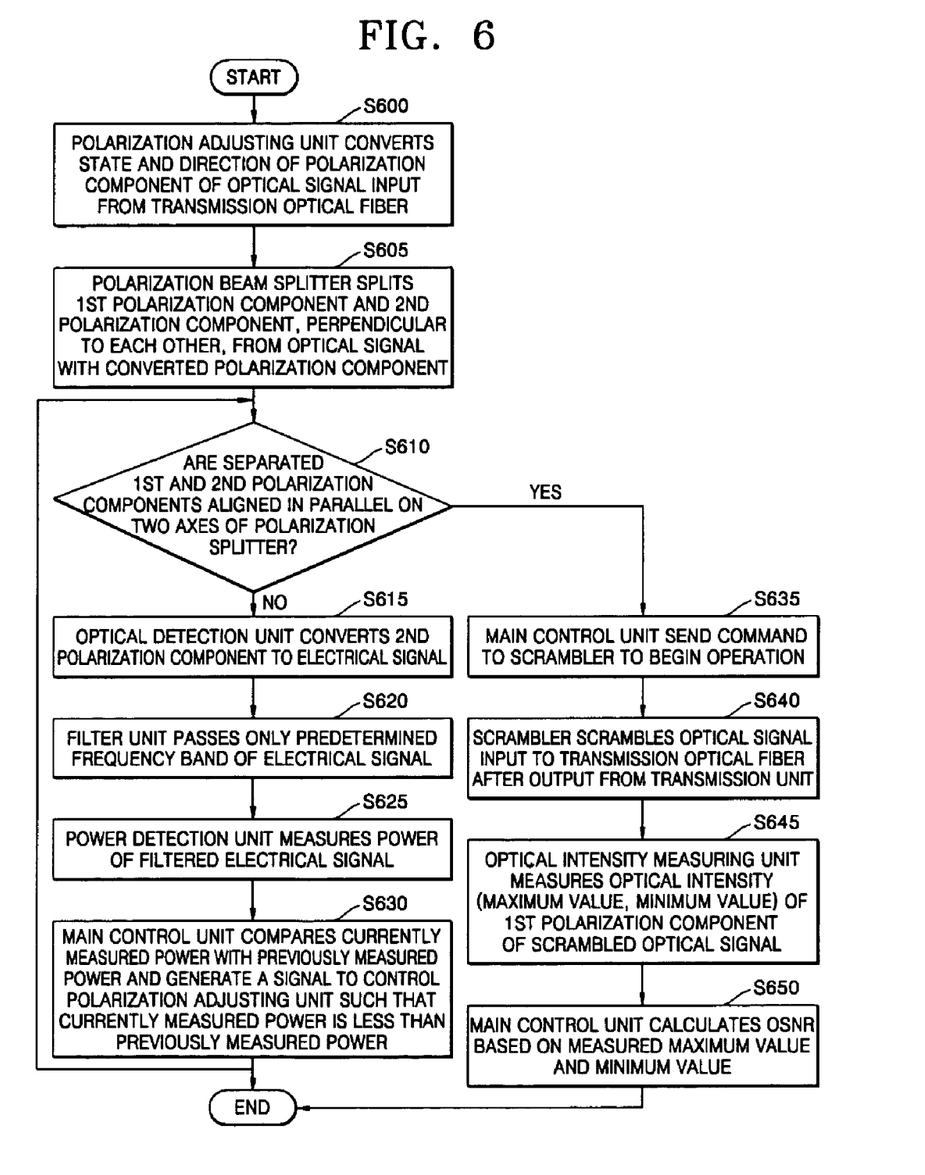
FIG. 6 is a flowchart of the steps performed by a method for monitoring an optical signal according to the present invention.

FIG. 6 is a flowchart of the steps performed by a method for monitoring an optical signal according to the present invention.

Referring to FIG. 6, the polarization adjusting unit 130 converts the state of polarization of an optical signal input from the transmission optical fiber 115, in step S600.

The polarization beam splitter 135 splits the optical signal, in which the polarization component is converted, into a first polarization component and a second polarization component, perpendicular to each other in step S605. The first and second polarization components split by the polarization beam splitter 135 are separated and output to the optical intensity measuring unit 160 and the feedback control unit 136, respectively. The feedback control unit 136 controls the polarization adjusting unit 130 so that the first and second polarization components are aligned in parallel to the two axes of the polarization beam splitter.

If the first and second polarization components split by the polarization beam splitter are not aligned in parallel to the two axes of the polarization beam splitter in step S610, the following steps are performed.

The optical detection unit 140 converts the second polarization component into an electric signal in step S615 and the filter unit 145 passes only a predetermined frequency band of the electric signal in step S620. The power detection unit 150 measures the power of the filtered electric signal in step S625.

The main control unit 155 compares the currently measured power with the previously measured power and generates a signal to control the polarization adjusting unit 130 such that the currently measured power is less than the previously measured power in step S630. If the control signal from the main control unit 155 is received, the polarization adjusting unit 130 converts the state and direction of the polarization component of the optical signal corresponding to the control signal in step S600.

If the first and second polarization components split by the polarization beam splitter 135 are aligned in parallel to the two axes of the polarization beam splitter 135 in step S610, the following steps are performed.

The main control unit 155 sends an operation start command to the scrambler 110 in step S635.

The scrambler 110 which receives the operation start command scrambles the optical signal output form the transmission unit 105 and input to the transmission optical fiber 115 in step S640. The scrambled optical signal repeats the maximum value and the minimum value cyclically.

The optical intensity measuring unit 160 measures the optical intensity of the first polarization component of the scrambled optical signal in step S645. Since the scrambled optical signal repeats the maximum value and the minimum value cyclically, the optical intensity measuring unit 160 measures the maximum value and the minimum value in step S645. By using the maximum value and the minimum value measured by the optical intensity measuring unit 160, the main control unit 155 calculates the OSNR in step S650.

Optimum embodiments have been explained above and are shown. However, the present invention is not limited to the preferred embodiment described above, and it is apparent that variations and modifications by those skilled in the art can be effected within the spirit and scope of the present invention defined in the appended claims.

According to the present invention, in a WDM optical transmission system where ASE noise level varies according to channels and there is PMD on the transmission optical link, the OSNR can be accurately measured. In addition, even when PMD varies temporally the OSNR can be accurately measured.

What is claimed is:

1. An apparatus for monitoring an optical signal comprising:
    a polarization adjusting unit which converts the state of polarization of an optical signal received through transmission optical fiber;
    a polarization beam splitter which splits the optical signal output from the polarization adjusting unit into a first polarization component and a second polarization component perpendicular to each other;
    an optical intensity measuring unit which measures the optical intensity of the first polarization component;
    a feedback control unit which by using the electric spectrum of the second polarization component, controls the polarization adjusting unit so that the first and second polarization components are aligned to the two axes of the polarization beam splitter; and
    a scrambler which if the first and second polarization components are aligned to the two axes of the polarization beam splitter by the feedback control unit, scrambles the optical signal input to the transmission optical fiber.

2. The apparatus of claim 1, wherein the optical intensity measuring unit measures the optical intensity of the first polarization component in which a maximum value and a minimum value vary cyclically.

3. The apparatus of claim 1, wherein the feedback control unit comprises:
    an optical detection unit which outputs an electric signal corresponding to the second polarization component;
    a filter unit which passes only a predetermined frequency band signal of the electric signal;
    a power detection unit which measures the power of the passed signal; and
    a main control unit which compares the measured power with a power previously measured by the power detection unit, and controls the polarization adjusting unit so that the currently measured power is less than the previously measured power.

4. The apparatus of claim 3, wherein if the first and second polarization components are aligned to the two axes of the polarization beam splitter, the main control unit operates scrambler and calculates an optical signal-to-noise ratio (OSNR) based on the optical intensity measured by the optical intensity measuring unit.

5. The apparatus of claim 1, wherein the optical signal is each individual channel in a wavelength division multiplexing (WDM) optical transmission system.

6. The apparatus of claim 1, further comprising:
    a wavelength variable filter unit which is disposed between the transmission optical fiber and the polarization adjusting unit and scans each wavelength channel of the received WDM optical signal from the transmission optical fiber, and outputs each channel to the polarization adjusting unit.

7. A method for monitoring an optical signal comprising:
    converting the state of polarization of an optical signal received through transmission optical fiber;
    splitting the optical signal, in which the polarization component is converted, into a first polarization component and a second polarization component perpendicular to each other;
    measuring the optical intensity of the first polarization component;
    by using the electric spectrum of the second polarization component, feedback controlling so that the first and second polarization components are aligned on predetermined two axes; and
    if the first and second polarization components are aligned to the two axes by the feedback controlling, scrambling the optical signal input to the transmission optical fiber.

8. The method of claim 7, wherein the measuring comprises:
    measuring the optical intensity of the first polarization component in which a maximum value and a minimum value vary cyclically.

9. The method of claim 7, wherein the feedback controlling comprises:
    outputting an electric signal corresponding to the second polarization component;
    passing only a predetermined frequency band signal of the electric signal;
    measuring the power of the passed signal; and
    comparing the measured power with a power previously measured, and controlling so that the currently measured power is less than the previously measured power.

10. The method of claim 9, wherein the controlling comprises:
    if the first and second polarization components are aligned to the two axes, scrambling input signal to transmission fiber and calculating an optical signal-to-noise ratio (OSNR) based on the measured optical intensity.

11. The method of claim 7, wherein the optical signal is each individual channel in a wavelength division multiplexing (WDM) optical transmission system.

12. The method of claim 7, further comprising before converting the state and direction:
    scanning each wavelength channel of the received WDM optical signal from the transmission optical fiber, and outputting each channel of the WDM optical signal.

* * * * *